June 22, 1948.   H. D. BOAL   2,443,762
FISH ROD HOLDER
Filed Aug. 27, 1945
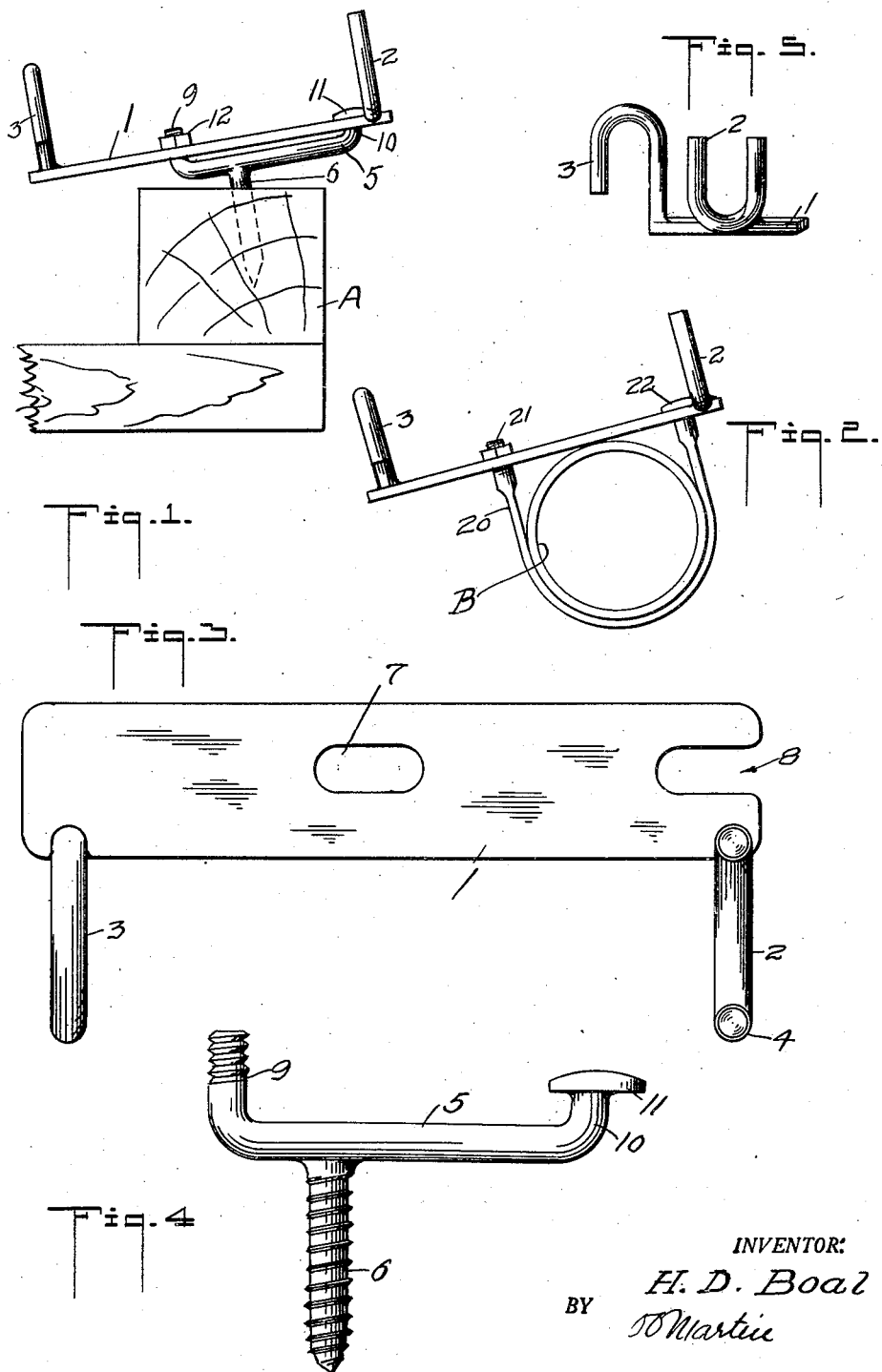
INVENTOR:
H. D. Boal
BY
JO Martin
ATTORNEY.

Patented June 22, 1948

2,443,762

UNITED STATES PATENT OFFICE 2,443,762

FISHING ROD HOLDER

Harold D. Boal, Gardena, Calif.

Application August 27, 1945, Serial No. 612,851

3 Claims. (Cl. 248—42)

This invention relates to a device for supporting fishing rods and has for its object to provide a device of this character which may be readily attached to a stationary object and which is adapted to hold a fishing rod firmly in position on such object. A further object is to provide a device which may be attached to stationary objects of different shapes. Another object is to provide a device which will firmly hold a fishing rod in position without any danger of marring or otherwise damaging the rod.

Other objects as well as the many advantageous features of the invention will be appreciated upon perusal of the following detailed description, and drawings are hereto appended in which preferred forms of the invention are illustrated.

In the drawings:

Fig. 1 shows my invention mounted in position on a stationary framework;

Fig. 2 illustrates my improved means for mounting the device on a cylindrical object;

Figs. 3 and 4 show the component parts of the invention; and

Fig. 5 is a perspective view of the rod holding element of the invention.

The structure of the invention comprises two main portions, namely the fishing rod holder and the bracket for mounting the holder in position.

The holder is shown in the form of a plate 1, which is made from flat material to one end of which is secured a grooved member 2 of a size to receive the fishing rod, and an inverted hook 3 rises from the other end of the plate. When a fishing rod is placed in the cradle in this manner provided, it is seen that it is guided within the members 2 and 3 and held from forward tipping within the hook of the member 3.

It is furthermore important to note that the two members are mounted to project laterally from one side edge of the plate in order to make certain that the rod, when mounted in position, is entirely clear of the plate. When, in addition, soft material, such as rubber tubing 4, is applied to cover these members, it is seen that nothing is present to mar the surface of the rod and so to impair the appearance thereof.

Two types of anchoring surfaces for the device are commonly available. One is the flat surface, such as the beam A which ordinarily is bolted to the edge of piers, substantially as indicated in Fig. 1. For mounting the rod holder in position on such flat surface, a support bracket 5 is used. This bracket is intermediate its ends made with a downwardly projecting shank 6, and the latter is shown provided with wood screw threads, substantially as indicated in Fig. 1.

It is noticed that the plate 1 is made intermediate its ends with an elongated perforation 7, and that a recess 8 is sunk into one end thereof. From one end of the bracket 5 rises a threaded stem 9, and the other end of the bracket is bent upward to form a short neck 10 terminating in a head 11. When the plate is seated on the bracket, the stem 9 rises through this perforation and the plate is thereupon pushed to the left until the neck 10, at the other end of the bracket, enters the recess 8. When thereupon a nut 12 is seated on the threads of the stem 9, it is seen that the plate may be rigidly secured in position on the bracket.

A flat surface is not always available to support the device, but often a rod or tubular railing is more convenient or the only support available, and the device is shown mounted on such support in Fig. 2. In this case, a U-shaped bracket or strap 20 is employed, and one end of this strap is threaded to form a stem 21, which is equivalent to the stem 9 of the bracket 5. The other end of the strap terminates in a head 22. The strap is pushed against the surface of a tubular support B, and it is readily seen that the plate is secured to this strap in substantially the same manner as in the case of the bracket 5. This combination has the advantage that the plate may be readily adjusted to any desired angular position on the support.

But whether the plate is secured in position in one way or the other, it is most important to note that the fishing rod is supported solely in the overhanging members 2 and 3 and does not come in contact with the plate or any other part adjacent thereto.

I claim:

1. A fishing rod holder comprising, a plate, guides for the rod secured to said plate and laterally overhanging one side edge thereof, said plate having an elongated perforation intermediate its ends and a recess at one end thereof, a member mountable on a stationary support, said member having a threaded stem extendable through said perforation and a portion seatable in said recess, and means engaging said threaded stem to clamp the member and plate rigidly together.

2. A fishing rod holder mountable on a support, said holder comprising, an elongated plate, a guide at one end thereof, a guide at the other end thereof, said guides projecting laterally from one side edge of the plate in parallel alignment therewith, a member seatable in said support and having one end extendable through said plate, the other end of the member being shaped for anchoring in the plate, and means engaging the end extended through the plate rigidly to clamp the plate and member together.

3. A fishing rod holder mountable on a cylindrical support comprising, a plate, guides for the rod secured to the plate and laterally overhanging one side edge thereof in parallel alignment with said edge, an elongated perforation in the plate and a recess at one end thereof, a member shaped to fit said cylindrical support and having one end extendable through said perforation, the other end of the member being seatable in said recess, and means engaging the end thereof extended through said perforation rigidly to clamp the plate and member together.

HAROLD D. BOAL.

REFERENCES CITED

The following references are of record in the file of this patent:

UNITED STATES PATENTS

| Number | Name | Date |
| --- | --- | --- |
| 803,646 | Walton | Nov. 7, 1905 |
| 1,275,928 | Huppertz | Aug. 13, 1918 |
| 1,786,254 | Meehan | Dec. 23, 1930 |
| 1,992,165 | Bardon | Feb. 26, 1935 |
| 2,099,254 | Ballman | Nov. 16, 1937 |
| 2,130,650 | Peterson | Sept. 20, 1938 |
| 2,176,352 | McHuron | Oct. 17, 1939 |
| 2,301,885 | Laehr | Nov. 10, 1942 |